United States Patent Office 3,677,892
Patented July 18, 1972

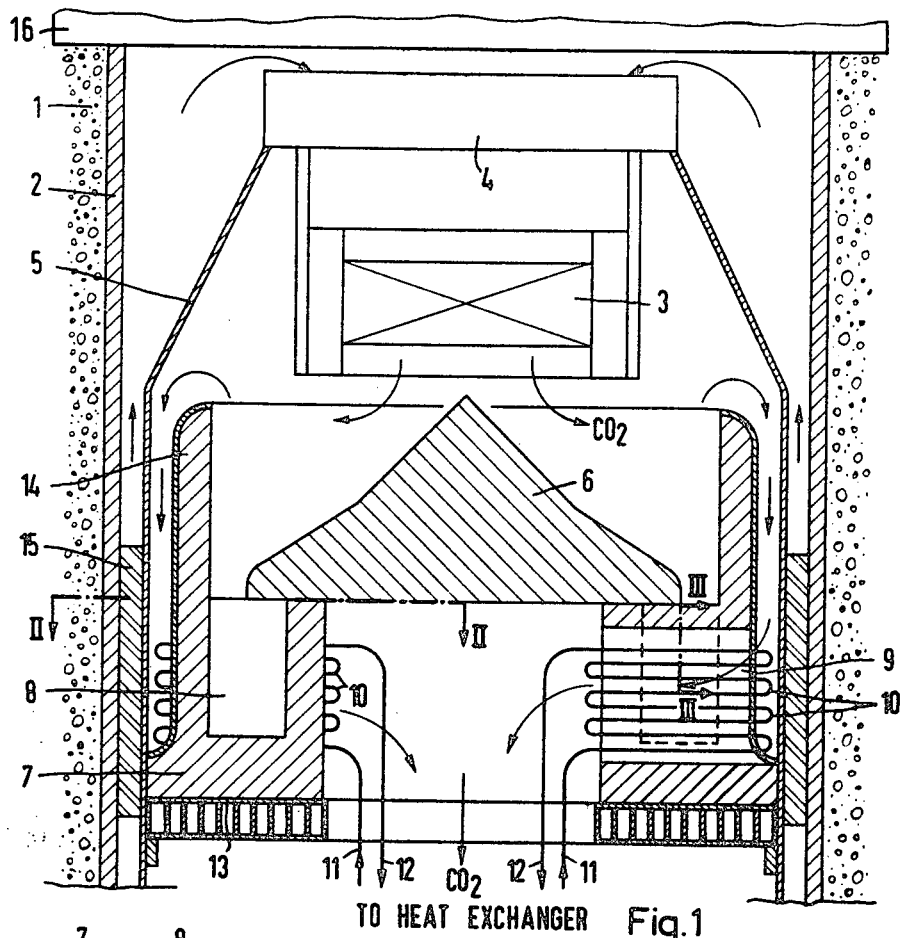
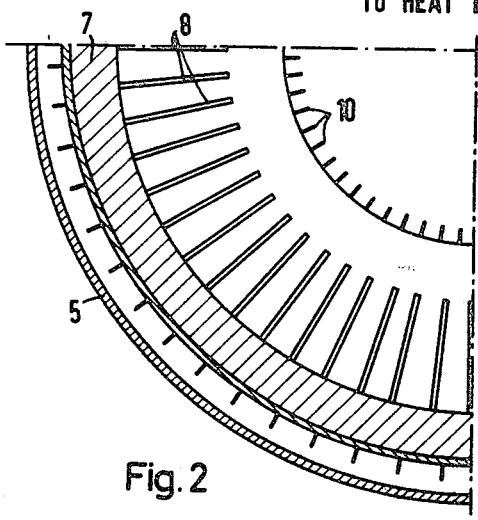
Fig. 2
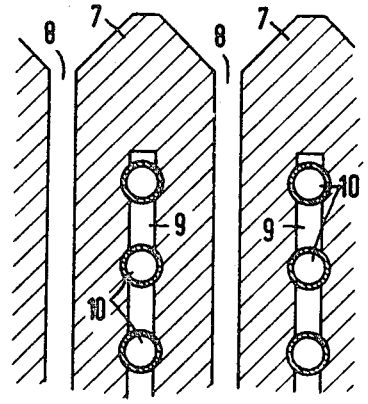
Fig. 3

3,677,892
COLLECTING DEVICE FOR COOLING REACTOR CORE FRAGMENTS IN A FAST BREEDER REACTOR
Hans-Peter Schabert, Erlangen, Germany, assignor to Siemens Aktiengesellschaft, Berlin and Munich, Germany
Filed May 12, 1969, Ser. No. 823,551
Claims priority, application Germany, May 14, 1968,
P 17 64 306.0
Int. Cl. G21c 1/02, 19/32
U.S. Cl. 176—40          8 Claims

ABSTRACT OF THE DISCLOSURE

In a fast breeder reactor provided with a substantially downwardly flowing primary gas coolant and having a reactor core and, located therebelow, a device for separating and a device for collecting reactor core fragments dropped from the reactor core, the cooling of nuclear fission fragments by passing the primary coolant of the reactor through the collecting device for cooling the reactor core fragments collected therein.

My invention relates to a device for cooling reactor core pieces or fragments in a fast breeder reactor.

In gas-cooled fast breeder reactors, cooled with $CO_2$ or helium, care must be taken that no critical mass is produced when the core or parts thereof are fused, which could cause an explosive reaction. Fusion or melting of the reactor core or parts thereof can be caused by failure of the reactor cooling system or by a power excursion.

To prevent the production of such a critical mass, it is known to dispose a distributor or separator device below the reactor core, whereon reactor core fragments drop from the reactor core. From there, they are generally removed sidewise and are conducted to a collecting device wherein they are cooled.

Due to the high density of the coolant in a sodium-cooled fast breeder reactor, the cooling of these core fragments present no problem. In gas-cooled fast breeder reactors, on the other hand, a separate cooling system for cooling the reactor core fragments in the collecting devices has heretofore always been provided, the coolant of the separate cooling system being generally liquid metal, steam or water. If however, the auxiliary cooling system fails during the fission of individual fuel elements, cooling can no longer be assured.

It is accordingly an object of my invention to provide a device for cooling reactor core fragments in a gas-cooled fast breeder reactor which will assure reliable cooling of the core fragments at all times.

With the foregoing and other objects in view I provide, in accordance with my invention, for cooling reactor core fragments in a fast breeder reactor provided with a substantially downwardly flowing primary gas coolant and having a reactor core and, located therebelow, a device for separating and a device for collecting reactor core fragments dropped from the reactor core, which comprises passing the primary coolant of the reactor through the collecting device for cooling the reactor core fragments collected therein.

In accordance with a further feature of the device of my invention, I pass an auxiliary coolant in a separate circulatory flow through the collecting device in addition to the main coolant flow therethrough. Consequently, double reliability is afforded by the use of the main coolant and the auxiliary coolant and, if the auxiliary cooling system should fail there will nevertheless still be assurance that the core fragments will be cooled by the primary coolant.

In accordance with the device of my invention, I provide in a fast breeder reactor provided with a substantially downwardly flowing primary gas coolant and having a reactor core, a device located below the core for separating reactor core fragments dropped thereon from the core, a device located below the separating device for collecting the dropped core fragments, the separating device having a substantially triangular cross section, the collecting device comprising a plurality of slit-shaped cooling pockets extending radially outwardly from the location of a lower marginal portion of the separating device, and radially extending cooling channels for the primary gas coolant located between the cooling pockets.

In accordance with another feature of the device of my invention, the cooling pockets are provided in an annular protective shield located closely beneath the separator device.

In accordance with additional features of the invention, radially extending cooling tubes for an auxiliary coolant flow are disposed in the cooling channels for the primary coolant; and have a sinuous shape within each channel.

In accordance with an added feature of my invention, the protective shield is formed with an annular portion located at the outer peripheral margin thereof and has substantially the same height as the separating device and surrounds the same.

In accordance with further features of my invention, both the separator device and the protective shield with the cooling pockets and the annular portion at the outer peripheral margin of the protective shield are formed of graphite and serve simultaneously as gas-permeable neutron shield for the heat exchanger space of the reactor.

Other features which are considered as characteristic for the invention are set forth in the appended claims.

Although the invention is illustrated and described herein as embodied in the device for cooling reactor core fragments in a fast breeder reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 1 is a vertical sectional view of part of a fast breeder nuclear reactor showing the reactor core and distribution or separator device constructed in accordance with my invention;

FIG. 2 is a cross-sectional view of FIG. 1 taken along the line II—II in the direction of the arrows showing the cooling pockets in a quadrant of the reactor cross section; and FIG. 3 is a sectional view of FIG. 1 taken along the line III—III in the direction of the arrows showing part of the cooling pockets and cooling channels.

Referring now to the drawing and first particularly to FIG. 1 thereof, there is shown a fast breeder nuclear reactor having a concrete containment or pressure vessel 1 within which the reactor core 3 proper is suspended from a support frame 4 that is carried by a supporting wall 5. As shown in FIG. 1, the supporting wall 5 extends downwardly to the bottom of the reactor; however it may also be secured, if desired, by non-illustrated tension or tie rods to the cover plate 16 of the pressure vessel 1. In the embodiment of the invention illustrated in FIG. 1, a distributor or separator device 6, in the form of a cone or pyramid, for separating the fragments that had been subjected to nuclear fission and which have fallen out of the reactor core 3, is located below the core 3. The base of the outer peripheral region of the separator device 6 is mounted on an annular protective shield 7 disposed coaxially to the cone and having an inner diameter portion of smaller diameter than that of the conical separator device 6 which is mounted thereon, and an outer diameter portion 14 of larger diameter than that of the separator device 6. The outer diameter portion 14 of the shield 7 is greater in length than the inner diameter portion by an amount substantially equal to the apex altitude of the conical separator device 6, so that the outer diameter portion 14 of the shield 7 surrounds the separator device 6 which is supported on the inner diameter portion of the shield 7. Slit-shaped cooling pockets 8 are provided in the protective shield 7 between the inner and outer diameter portions thereof and extending radially outward from the location of the lower edge of the conical separator device 6. Radially extending cooling channels 9 for the primary coolant of the reactor are disposed between these cooling pockets 8. Radially extending cooling tubes 8 for an auxiliary or secondary coolant are provided within the cooling channels 9 for the primary reactor coolant. The cooling tubes 10 are sinuously disposed within each of the cooling channels 9 and are traversed by coolant flowing in an upward direction as is represented by the arrowheads on the connecting lines 11 and 12 for the secondary coolant tubes 10. Components of the cooling pockets 8 and channels 9 are shown in rather enlarged sectional views in FIGS. 2 and 3. According to FIG. 2 especially, it can be seen that the cooling pockets 8 are of very flat and narrow construction in order to assure an effective cooling action. Thus, the fragments or members subjected to nuclear fission such as the fuel elements, control rods and the like, when dropping out of the reactor core 3, strike against the conical separator device 6, and fall into the cooling pockets 8 and are thereby collected between the inner diameter and outer diameter portions of the protective shield 7.

The collector device 7, with the separator device 6 superimposed thereon, is mounted on a support plate 13 which is secured to the supporting wall 5 that carries the frame 4 from which the reactor core 3 is suspended.

The primary coolant of the fast breeder reactor, for example $CO_2$ in this case, flows upwardly through the space between the supporting wall 5 and an insulating layer 2 disposed on the inner surface of the concrete pressure vessel 1. A gas-permeable additional shielding 15 is located in the flow space between the supporting wall 5 and the insulating layer 2 at the level substantially of the separating and collecting devices 6 and 7. The primary coolant reverses its flow direction at the non-illustrated cover of the pressure vessel 1, as represented by the curved arrows at the top of FIG. 1, and then flows downwardly in the center of the pressure vessel 1 through the reactor core 3 initially where it absorbs desired heat, and then between the annular outer diameter shield portion 14 and the supporting wall 5 to the cooling channels 9 between the cooling pockets 8 in the lower part of the protective shield 7. The coolant flows radially inwardly toward the axis of the pressure vessel 1 and from there further to non-illustrated heat exchangers which are located below or to the side of the core.

The pieces or fragments subjected to nuclear fission which have dropped into the cooling pockets 8 are reliably cooled on the one hand by primary coolant flowing through the coolant channels 9 located between the individual pockets 8, and on the other hand by secondary coolant, generally of liquid metal, steam or water, flowing through the cooling coils 10. By means of this double cooling action, reliable removal of excess heat is afforded even when one of the cooling systems fails.

Both the separator device 6 as well as the shield or collection device 7, including the portion 15, are advantageously made of graphite. Consequently, these components i.e., the separator device 6 and collection device 7 serve simultaneously as gas-permeable neutron shielding for the heat exchanger chamber located therebelow for example.

For further details of a fast breeder reactor with which the device of the invention in the instant application may be employed, reference can be had to application Ser. No. 821,030, filed May 1, 1969, of which I am joint inventor.

I claim:

1. In a fast breeder reactor provided with a substantially downwardly flowing primary gas coolant and having a reactor core, a device located below the core for separating core fragments dropped thereon from the core, a device located below said separating device for collecting the dropped core fragments, said separating device having a substantially triangular cross section, said collecting device comprising a plurality of slit-shaped cooling pockets extending radially outwardly from the location of a lower marginal portion of said separating device, and radially extending cooling channels for the primary gas coolant located between said cooling pockets.

2. Reactor according to claim 1 wherein said cooling pockets are disposed in an annular protective shield located closely beneath said separator device.

3. Reactor according to claim 2 wherein said protective shield is formed with an annular portion located at the outer peripheral margin thereof, said annular portion having substantially the same height as that of said separating device and surrouding said separating device.

4. Reactor according to claim 3 wherein both said separator device and said protective shield, including said annular portion thereof located at the outer perhipheral margin of said protective shield are formed essentially of graphite and serve simultaneously as gas-permeable neutron shield for a space adapted to receive at heat exchanger.

5. Reactor according to claim 1 including radially extending cooling tubes for an auxiliary coolant flow disposed in said cooling channels for said primary coolant.

6. Reactor according to claim 5 wherein said cooling tubes have a sinous shape within each of said channels and have a plurality of substantially horizontally extending lengths.

7. Reactor according to claim 1 wherein said separating device has a substantially conical shape.

8. Reactor according to claim 1 wherein said separating device has a substantially pyramidal shape.

References Cited

UNITED STATES PATENTS

| 3,249,507 | 5/1966 | Gondoin et al. | 176—59 |
| 3,322,643 | 5/1967 | Sprague et al. | 176—59 |
| 3,357,892 | 12/1967 | Schmidt | 176—38 X |
| 3,378,452 | 4/1968 | Costes | 176—40 |
| 3,506,540 | 4/1970 | Yevick et al. | 176—87 |

FOREIGN PATENTS

| 958,088 | 5/1964 | Great Britian | 176—40 |
| 1,115,292 | 5/1968 | Great Britian | 176—59 |

CARL D. QUARFORTH, Primary Examiner

R. GAITHER, Assistant Examiner

U.S. Cl. X.R.

176—37, 59